United States Patent

[11] 3,631,818

| [72] | Inventor | Santo Zito<br>Los Angeles, Calif. |
|---|---|---|
| [21] | Appl. No. | 880,880 |
| [22] | Filed | Nov. 28, 1969 |
| [45] | Patented | Jan. 4, 1972 |
| [73] | Assignee | DOB, a division of Fairmont Foods, Co.<br>Los Angeles, Calif. |

[54] PIZZA SAUCE APPARATUS
8 Claims, 5 Drawing Figs.

| [52] | U.S. Cl. | 99/450.7 |
|---|---|---|
| [51] | Int. Cl. | A21c 9/04 |
| [50] | Field of Search | 107/27 R, 1 A, 1 B |

[56] References Cited
UNITED STATES PATENTS

| 1,771,117 | 7/1930 | Greer | 107/27 R |
|---|---|---|---|
| 1,847,118 | 3/1932 | Larsen | 107/27 R |
| 1,859,971 | 5/1932 | Keck | 107/27 X |
| 1,974,336 | 9/1934 | Kremmling | 107/1 B |
| 2,405,879 | 8/1946 | Fredricksen | 107/1 B |
| 2,719,496 | 10/1955 | Arnieri | 107/27 R |
| 2,854,170 | 9/1958 | Borgardt et al. | 107/27 R |
| 2,872,245 | 2/1959 | Groth | 107/27 X |

Primary Examiner—Frank L. Abbott
Assistant Examiner—Sam D. Burke
Attorney—Hume, Clement, Hume & Lee ABSTRACT: An apparatus and method are provided for applying pizza sauce to a plurality of pizza shells in which: an indexing conveying assembly moves the shells into position beneath a plurality of rotating distribution nozzles, a piston assembly draws a measured amount of sauce from a supply hopper and then discharges the sauce through the nozzles and onto the pizza shells, a three-way valve, for each piston assembly and distribution nozzle, serves to connect the supply hopper and piston assembly to the nozzles in its opposite position, and a control assembly detects the presence of a pizza shell below each nozzle and activates the valve to permit discharge of sauce into the distribution nozzles.

INVENTOR
SANTO ZITO
BY HUME, CLEMENT,
HUME & LEE
ATTORNEYS

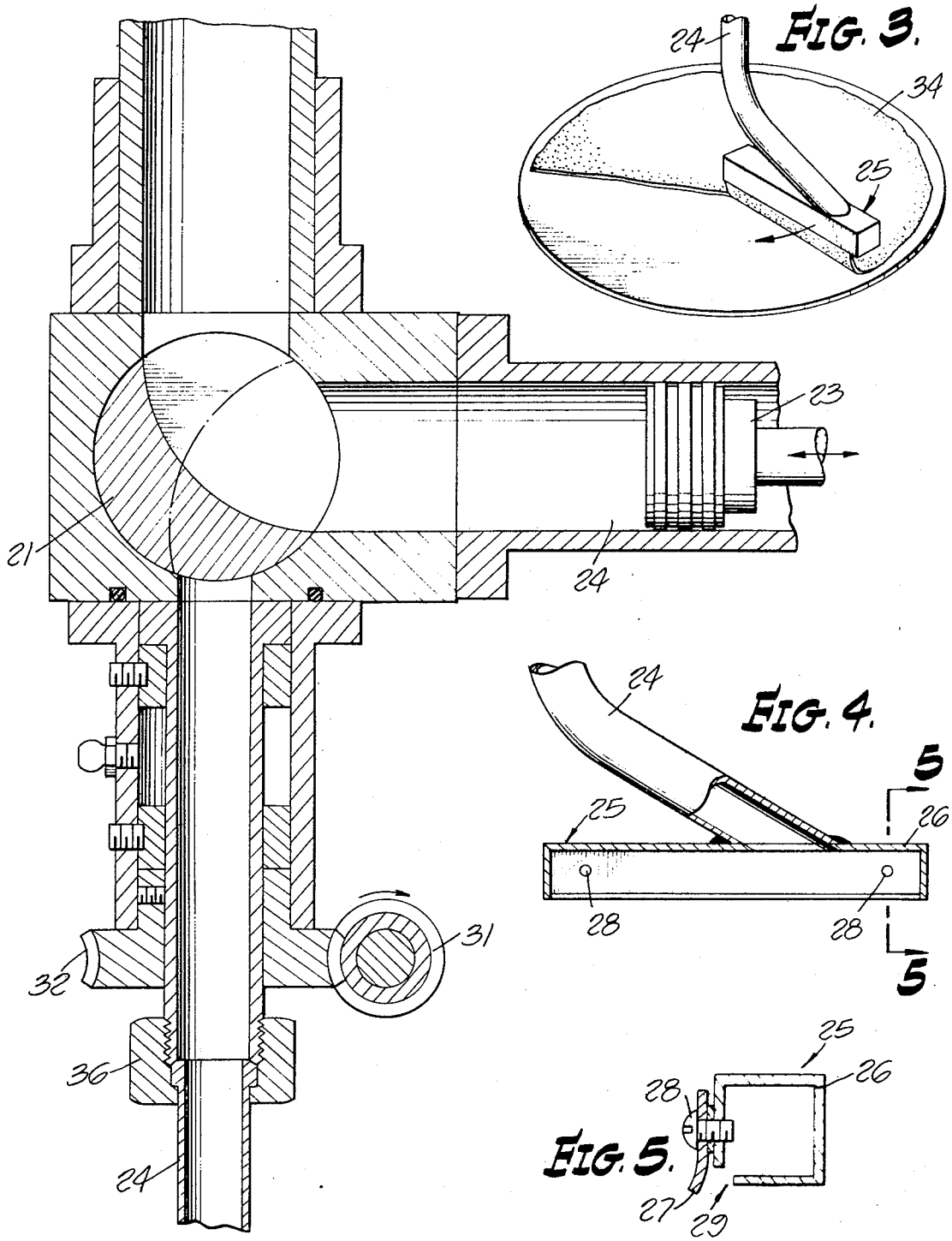

PIZZA SAUCE APPARATUS

BACKGROUND OF THE INVENTION

This invention relates to high-speed food processing equipment, and more specifically concerns an apparatus and method for rapidly and effectively applying a pizza sauce material to a plurality of pizza shells or crusts.

The need for improved high-speed food processing equipment has existed in the food processing industry for some time. This need is particularly evident in the processing equipment presently used to make pizzas and to apply sauce to pizza shells or crusts. Mechanical methods and apparatus presently used for applying tomato sauces and the like to pizza crusts in high-speed food processing equipment typically employ feed mechanisms which first index crusts under stationary sauce dispensing tubes, and then rotate the crusts as sauce is ejected through the tubes. Since the sauce dispensing tubes in such apparatus are normally quite small in diameter, the tubes tend to become easily plugged by seeds, tomato skins, and loose peels in the tomato sauce. As a result, pastelike sauces must be used. In addition, the equipment used to rotate the crusts is complex, operates at low-processing speeds, and is not well suited for easy adjustment to accommodate different sizes of pizza crusts. Consequently, a less complex, more flexible and improved apparatus for applying tomato sauce to pizza crusts has been desired for some time.

SUMMARY OF THE INVENTION

According to this invention, an improved method and apparatus for applying tomato sauces to pizza crusts is provided for use in high-speed pizza making equipment. One embodiment of this invention involves the use of a plurality of rotatable pizza sauce dispensing nozzles to apply sauce to pizza crusts. These nozzles are made up of a hollow rotatable shaft and a radially extending head portion connected to the shaft and adapted to discharge pizza sauce on crusts positioned below the radially extending head. A conveying assembly is used to intermittently transmit a plurality of pizza crusts along a flat horizontal deck; and the conveying assembly is designed to interrupt the movement of crusts when pizza sauce is being applied from the nozzles. In addition to the nozzles and conveying assembly, a storage means which is equipped to receive a supply of pizza sauce is positioned above the nozzles and is adapted to furnish pizza sauce to the rotating nozzles. An assembly is also provided to control the supply of pizza sauce to the distribution nozzles and a second assembly is provided for rotating the distribution nozzles.

In other embodiments of this invention, a piston assembly is associated with the hollow shaft of the distribution nozzles and the storage means and is adapted to first draw a measured amount of pizza sauce from the storage means and then to discharge the sauce into the nozzles for eventual deposit on the pizza crusts below. A valve is also provided to connect the piston assembly with the supply means and the distribution nozzles. One position of the valve connects the supply means with the piston assembly to permit a measured amount of sauce to be drawn from the supply means by the action of the piston assembly, while the opposite position of the valve connects the piston assembly with the distribution nozzles to permit the reverse action of the piston assembly to discharge a measured amount of sauce into the distribution nozzles.

Finally, a control assembly associated with the flat horizontal deck of the conveying assembly can be used to detect the presence of pizza crusts beneath the radially extending head portion of the nozzles and to cause the valve to connect the piston assembly with the distribution nozzles so that pizza sauce can be applied to the crusts.

The numerous advantages represented by this invention are apparent from an examination of the various components of the invention. The use of rotating dispensing nozzles and stationary crusts permits the uniform application of sauce over the pizza crusts to within any desired distance of the outside edge of the crust. Thus, a mere adjustment in the rotational speed of the nozzles and the amount of sauce drawn from the supply means can add significant flexibility in the application of sauce to a variety of crusts. Moreover, the use of hollow shaft and radially extending head portion of the dispensing nozzles, rather than narrow tubes, permits the passage of seeds, peels, and other solids through the nozzles without obstruction of the sauce passages. The use of a valve actuated by a control assembly in the flat horizontal deck provides a "failsafe" character to the apparatus of this invention, since sauce cannot be discharged to the nozzles unless a pizza crust is in a proper position beneath the nozzles to receive the sauce. Furthermore, it should also be apparent that the apparatus of this invention is extremely flexible in that nozzle sizes can be quickly changed to meet varying pizza sizes. The apparatus can also operate at high-processing speeds, operates without the necessity of manual labor, and can be quickly and easily cleaned without disassembly.

BRIEF DESCRIPTION OF THE DRAWINGS

The invention will be better understood by reference to the drawings in which:

FIG. 2 is an exploded cross-sectional view of FIG. 1 and shows a portion of the piston assembly and a three-way valve which connects a supply hopper to the piston assembly and the piston assembly to he distribution nozzles;

FIG. 3 is a perspective view of one rotating distribution nozzle as it applies sauce to a stationary pizza crust;

FIG. 4 is a partial cross-sectional view of a distribution nozzle showing the hollow rotatable shaft secured to the radially extending head portion of the nozzle; and FIG. 5 is a cross-sectional view of FIG. 4 showing a cross section of the radially extending head portion of the distribution nozzle.

DESCRIPTION OF THE PREFERRED EMBODIMENTS

Figure 1:
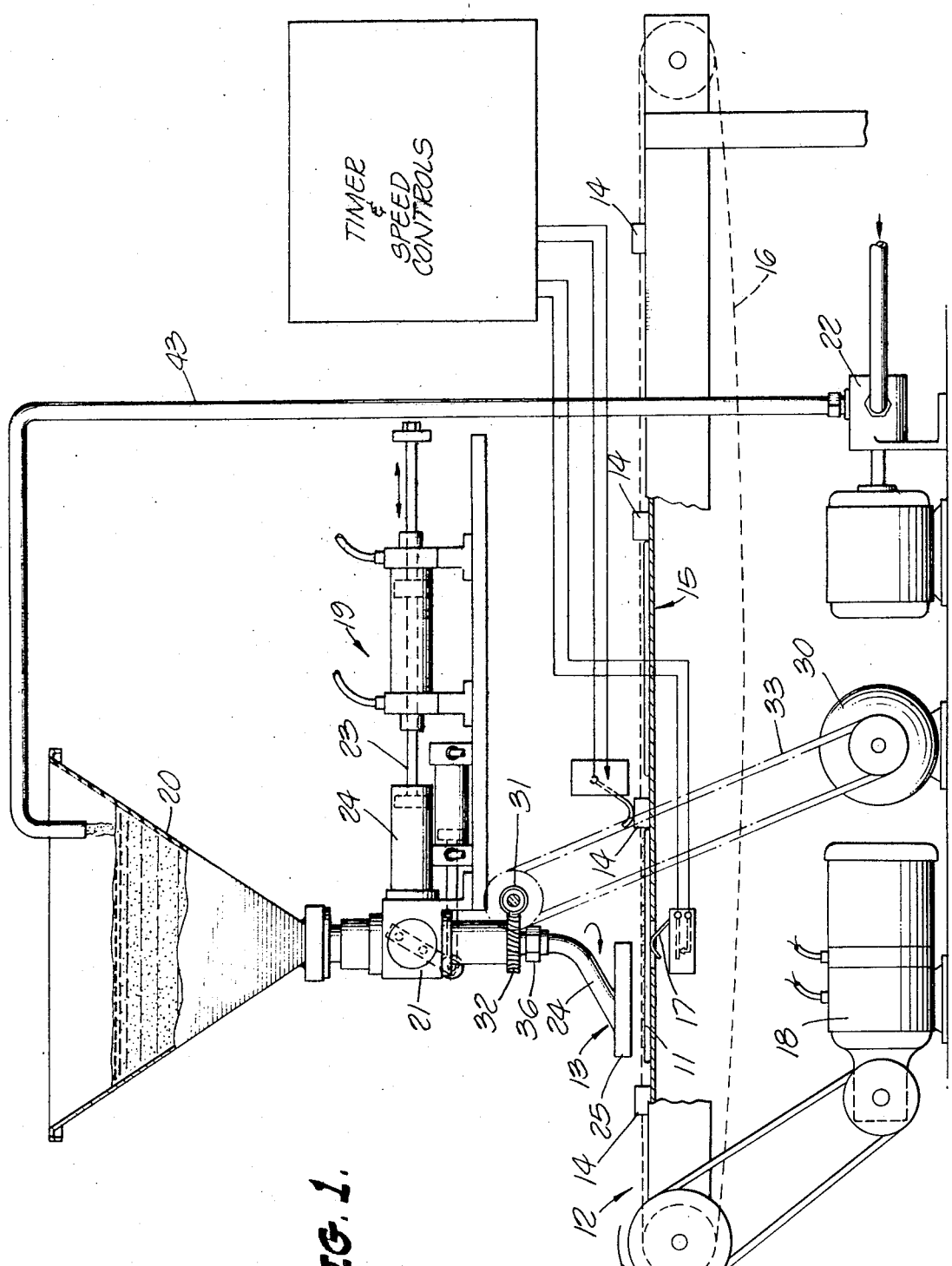
FIG. 1 is an end elevational view of one form of apparatus suitable for practicing this invention.

Referring now to the drawings, and particularly to FIG. 1, it can be seen that in operating the apparatus of this invention, pizza shells or crusts 11 are placed on a conveying assembly 12, which intermittently moves the crusts into positions beneath distribution nozzles 13. The conveying assembly 12 is preferably composed of a plurality of spaced transport bars 14, which lie across the flat horizontal bed in a position transverse to the direction of movement for the pizza crusts. Each end of transport bars is secured to a chain drive assembly 16, which is driven by motor 18 and serves to move transport bars 14 along bed assembly 15 in an intermittent or indexing fashion. Thus, after a series of pizza crusts are loaded along the lead edges of the spaced bars, they are moved into a position beneath distribution nozzles 13.

Since the pizza crusts must be exactly positioned under each of the distribution nozzles for the proper application of sauce to be effected, transport bars 14 are provided with a series of V-shaped indentations spaced along their lead edge. These indentations are sufficiently large to accommodate a circular pizza crust and hold it against lateral movement along the transport bar. The spacing of indentations in transport bars 14 correspond to the spacing between adjacent distribution nozzles 13. In this way, the pizza crusts tend to line up the indentations by gradually rolling laterally along the bar until they fall into the indentations where they are held in place until reaching the distribution nozzles.

As each crust 11 approaches a distribution nozzle 13, it passes over a switch 17, which protrudes from the surface of bed assembly 15. When switch 17 is depressed, it indicates that crust 11 is in proper position below distribution nozzle 13. Consequently, a relay is actuated and pizza sauce is deposited from the distribution nozzle onto the crust. However, when switch 17 is not depressed, sauce will not be deposited from the distribution nozzle.

The actual discharge of pizza sauce from nozzle 13 involves the cooperation of piston assembly 19, overhead supply hopper 20 and three-way valve 21. Supply hopper 20 acts as a source of pizza sauce for piston assembly 19. Pump 22 is provided to feed fresh sauce from floor level through line 43 into the supply hopper. The action of pump 22 can be either manually controlled or a float switch in supply hopper 20 can be used to actuate pump 22 so that a constant supply of fresh sauce is always available for distribution.

Piston assembly 19 is provided to draw pizza sauce from the supply hopper 20 and then discharge the sauce through the distribution nozzles and onto the pizza crusts. In actual operation, the intake stroke of rod 23 draws a measured volumetric amount of sauce from the supply hopper into chamber 24. The amount of sauce drawn depends upon the length of the intake stroke of rod 23 and thus can be readily adjusted to suit various processing conditions. The reverse stroke of rod 23 causes the measured amount of sauce to be discharged into distribution nozzle 13 or back into supply hopper depending upon the position of valve 21.

FIG. 2 illustrates the three-way nature of valve 21. In one position the valve serves to connect supply hopper 20 with piston assembly 19. In its opposite position, valve 21 serves to connect piston assembly 19 with distribution nozzle 13. During the intake stroke of rod 23 the three-way valve is open to supply hopper 20. However, both the reverse stroke of rod 23 and the position of valve 21 are controlled by switch 17. When switch 17 is depressed, indicating that a pizza crust is properly indexed below nozzle 13 and in position for the application of sauce, then both valve 21 and rod 23 are activated so that valve 21 connects the piston assembly with the distribution nozzle and rod 23 makes its reverse stroke to discharge sauce into nozzle 13. However, when no crust is positioned below nozzle 13, then switch 17 is not depressed and the reverse stroke of rod 23 merely pumps the sauce back into the storage hopper.

Distribution nozzle 13 is constructed from a hollow shaft 24 and a radially extending head 25 secured to the shaft. As shown in FIGS. 4 and 5, the rectangular-shaped, radially extending, head 25 of nozzle 13 has body portion 26 secured to hollow shaft 24. The body 26 is partially closed by means of adjustable bracket 27 secured to one side of the body 26 by screw 28. Adjustment in the position of bracket 27 permits opening 29 in the lower end of radially extending head 25 to be adjusted to allow more or less sauce to flow through the distribution nozzle 13.

The distribution nozzle is rotated by means of motor assembly 30 which drives helical gears 31 and 32 through belt 33. The speed of rotation for the distribution nozzles can be easily controlled from 0 to 150 revolutions per minute. Thus, the evenness of the deposit of sauce is determined by the rotational speed of the radially extending head 25, the size of the opening 29 in the bottom of head 25 and the speed of the piston stroke of rod 23 which forces sauce through hollow shaft 24 and into the head.

Typically, radially extending head 25 is adapted to rotate in a circle which is substantially smaller in diameter than pizza crust positioned below. In this way, centrifugal force imparted to the sauce 34 by the revolution of head 25 causes the sauce to spread over an area greater in diameter than the circle defined by head 25. Thus, the pizza sauce 34 can be evenly applied within any distance from he outer edge of pizza crust 11 as shown in FIG. 3, by simply adjusting the rotational speed of head 25. In addition, it should be noted that the design of distribution nozzle 13 is such as to provide a greater flow of sauce at the outer edge of pizza crust 11 and a reduced flow at the center of the crust because of the centrifugal effect caused by rotating head 25 and because shaft 24 is positioned close to the outer end of head 25. Thus, an even distribution of sauce is accomplished rather than a conical deposit which could result from other distribution techniques.

It should be understood that preferred embodiments of this invention would have a number of distribution nozzles 13 aligned transverse to the direction of movement of the crusts. Typically, four such distribution nozzles are used together with a corresponding set of piston assemblies 19 and three-way valves 21. In this way, each transport bar 14 is adapted to carry four pizza crusts under the corresponding distribution nozzles 13.

Tests conducted have shown that the total variation in the weight of pizza sauce applied to the crusts can be accurately controlled within a range of plus or minus 2 percent of a predetermined weight of sauce for each crust. In addition, it has been observed that by varying the speed of advance of transport bars 14 and the speed of rotation for radially extending heads 25 of the distribution nozzles, the processing speed of the apparatus of this invention can be varied between a range of 0 to 180 pizzas processed per minute. Moreover, the size of the pizza crusts processed and the rate at which sauce is applied can also be easily varied to various desired levels.

In order to adapt the apparatus of this invention to accommodate different sizes of pizza crusts, distribution nozzles 13 are merely removed by loosening coupling 36, and replacing the old nozzles with a new set of differently sized nozzles. After the new nozzles are inserted into position and secured by coupling 36, the indexing point for transport bars 14 is adjusted so that the pizza crusts will be properly centered below the new nozzles. If a change in the volume of sauce is desired, the size of opening 29 in horizontal head 25 is adjusted along with the speed of rotation of the distribution nozzles and the intake stroke of rod 23.

The apparatus of this invention is capable, therefore, of easy and quick adjustment for a variety of processing conditions. Moreover, the large size of the openings in the hollow shaft 24 and radially extending head 25 permit the passage of seeds and peels in the pizza sauce without obstructing the flow of sauce onto the pizza crusts.

I claim:

1. An apparatus for distributing a measured volumetric amount of pizza sauce material on the surface of each of a plurality of pizza shells comprising:
   a plurality of rotatable distribution nozzles having a hollow shaft terminating in a radially extending head;
   means for rotating said distribution nozzles to distribute pizza sauce material over the surface of pizza shells;
   storage means for containing a supply of pizza sauce;
   conveying means for transmitting the plurality of pizza shells beneath said distribution nozzles; and
   means for applying a measured volumetric amount of pizza sauce to said distribution nozzles for each of the pizza shells including:
   piston means corresponding to each of said nozzles for drawing a measured amount of pizza sauce from said storage means and discharging the sauce into said distribution nozzles;
   valve means for connecting said storage means with the piston means to permit a measured amount of sauce material to be drawn from said storage means and for connecting said piston means with each of the corresponding distribution nozzles to discharge the measured amount of sauce material through said distribution nozzles and onto the pizza shells; and
   control means associated with said conveying means for detecting the presence of pizza shells beneath said distribution nozzles and for initiating the delivery of the measured volumetric amount of pizza sauce material through said nozzles and onto the pizza shells.

2. An apparatus as described in claim 1 wherein the radially extending head of the distribution nozzles has an adjustable opening.

3. An apparatus as described in claim 2 wherein the radially extending head of the rotating distribution nozzles defines a circle of smaller diameter than the diameter of the pizza shells below said rotating nozzles.

4. An apparatus of claim 1 wherein said means for rotating said distribution nozzles is capable of varying the rotational speed of said nozzles.

5. An apparatus as described in claim 1 wherein said conveying means comprises:
   a plurality of spaced transport bars lying across a flat horizontal deck and positioned transverse to the direction of movement of said pizza shells, said bars having a series of V-shaped indentations spaced along their leading edge to accommodate a circular pizza shell and prevent lateral movement of said shell; and
   an indexing drive means connected to said transport bars, said drive means being adapted to interrupt movement of said bars when said pizza shells are in position to receive pizza sauce material from said distribution nozzles.

6. An apparatus as described in claim 1 wherein the control means is a spaced plurality of curved switches protruding from said conveying means, one of said switches corresponding to each of said distribution nozzles and each of said switches being positioned below each of said nozzles so that pizza shells passing over said switches will depress the switches causing said valve means to connect said piston means with said nozzles to permit the discharge of pizza sauce material from said nozzles onto said pizza shells.

7. An apparatus as defined in claim 6 wherein the intake stroke of said piston means draws a measured volumetric amount of pizza sauce from said supply hopper and the reverse stroke of said piston means discharges said pizza sauce to said distribution nozzles only when said switches are depressed by the pizza shells.

8. An apparatus for applying a measured volumetric amount of pizza sauce material to each one of a plurality of pizza shells comprising:
   a plurality of rotatable distribution nozzles each having a hollow shaft and a radially extending head portion communicating with said shaft;
   means for rotating said distribution nozzles;
   means for transmitting a plurality of pizza crusts beneath said distribution nozzles;
   storage means for containing a supply of pizza sauce material;
   means for stopping the movement of said crusts to index said crusts beneath said distribution nozzles;
   means for drawing a measured amount of pizza sauce material from said storage means;
   means for detecting whether each pizza shell is in indexed position beneath said rotatable nozzles to receive the pizza sauce material; and
   means controlled by said detecting means for delivery of said measured amount of said pizza sauce material when said crusts are positioned beneath said rotatable nozzles.

* * * * *